United States Patent
Nakakuki et al.

(10) Patent No.: US 9,862,408 B2
(45) Date of Patent: Jan. 9, 2018

(54) ELECTRIC POWER STEERING DEVICE AND ELECTRIC POWER STEERING DEVICE CONTROL DEVICE

(71) Applicant: HITACHI AUTOMOTIVE SYSTEMS, LTD., Hitachinaka-shi, Ibaraki (JP)

(72) Inventors: Yasuhito Nakakuki, Atsugi (JP); Masaki Kodato, Sagamihara (JP); Kazuya Yamano, Yamato (JP); Yoshitaka Sugiyama, Machida (JP); Tsukasa Miyajima, Atsugi (JP); Masahiko Ushimura, Kanagawa (JP)

(73) Assignee: HITACHI AUTOMOTIVE SYSTEMS, LTD., Hitachinaka-Shi (JP)

( * ) Notice: Subject to any disclaimer, the term of this patent is extended or adjusted under 35 U.S.C. 154(b) by 0 days.

(21) Appl. No.: 15/121,193

(22) PCT Filed: Jan. 14, 2015

(86) PCT No.: PCT/JP2015/050745
§ 371 (c)(1),
(2) Date: Aug. 24, 2016

(87) PCT Pub. No.: WO2015/141253
PCT Pub. Date: Sep. 24, 2015

(65) Prior Publication Data
US 2016/0368531 A1 Dec. 22, 2016

(30) Foreign Application Priority Data
Mar. 19, 2014 (JP) .................................. 2014-055857

(51) Int. Cl.
*B62D 5/04* (2006.01)
*B62D 6/04* (2006.01)

(52) U.S. Cl.
CPC ......... *B62D 5/0463* (2013.01); *B62D 5/0409* (2013.01); *B62D 6/04* (2013.01)

(58) Field of Classification Search
CPC combination set(s) only.
See application file for complete search history.

(56) References Cited

U.S. PATENT DOCUMENTS

2008/0033613 A1* 2/2008 Tamaizumi .......... B62D 5/0463
  701/41
2009/0240389 A1   9/2009 Nomura et al.
(Continued)

FOREIGN PATENT DOCUMENTS

JP    61-295172 A    12/1986
JP    2007-320429 A  12/2007
(Continued)

*Primary Examiner* — Kevin Hurley
*Assistant Examiner* — Gabriela C Craciun
(74) *Attorney, Agent, or Firm* — Foley & Lardner LLP (57) ABSTRACT

A transverse gradient current Ic which is larger than a basic assist current Ib is outputted, as a current command value, to motor driving section when direction correspondence judgment section 11 judges that rotation directions of first and second rotation angle signals θ1 and θ2 correspond with each other, when an advancing phase judgment section 12 judges that a phase of the second rotation angle signal is advanced, and when a phase variation judgment section 14 judges that a phase advance state of the second rotation angle signal θ2 continues.

20 Claims, 7 Drawing Sheets

(56) References Cited

U.S. PATENT DOCUMENTS

| | | | | |
|---|---|---|---|---|
| 2012/0261209 | A1 | 10/2012 | Shiino | |
| 2012/0296525 | A1* | 11/2012 | Endo | B62D 5/0466 |
| | | | | 701/42 |
| 2013/0233639 | A1 | 9/2013 | Kodato et al. | |
| 2013/0304327 | A1* | 11/2013 | Morishita | B62D 5/0463 |
| | | | | 701/43 |
| 2015/0068833 | A1* | 3/2015 | Takashima | B62D 5/0409 |
| | | | | 180/444 |
| 2015/0239494 | A1* | 8/2015 | Fukunaga | H04Q 9/00 |
| | | | | 701/43 |
| 2016/0280256 | A1* | 9/2016 | Wei | B62D 5/0409 |
| 2017/0166246 | A1* | 6/2017 | Gotou | B62D 5/0466 |
| 2017/0183029 | A1* | 6/2017 | Uryu | B62D 5/0487 |

FOREIGN PATENT DOCUMENTS

| | | |
|---|---|---|
| JP | 2010-137621 A | 6/2010 |
| JP | 2012-225679 A | 11/2012 |
| JP | 2013-184622 A | 9/2013 |
| JP | 2014-004920 A | 1/2014 |

\* cited by examiner

ELECTRIC POWER STEERING DEVICE AND ELECTRIC POWER STEERING DEVICE CONTROL DEVICE

TECHNICAL FIELD

This invention relates to an electric power steering device applied to a vehicle and so on, and a control device for the electric power steering device.

BACKGROUND ART

There is known, for example, a patent document which is described below, and which discloses a conventional electric power steering device.

That is, the power steering device described in this patent document includes a control means configured to prevent a vehicle body pull (oblique motion) when a vehicle travels on a cant road. The control means is configured to drivingly control an electric motor, and thereby to decrease a load of a driver which is for preventing the diagonal motion on the cant road.

PRIOR ART DOCUMENT

Patent Document

Japanese Patent Application Publication No. 2010-137621

SUMMARY OF THE INVENTION

Problems which the Invention is Intended to Solve

However, the conventional electric power steering device is configured to judge the oblique motion based on a disturbance from a relationship between a yaw rate signal, a steering angle signal and so on. This causes a complication of the control.

It is, therefore, an object of the present invention to provide a power steering device and so on which is devised to solve the above-mentioned problems, and to judge a diagonal motion state based on a disturbance with high accuracy only by rotation angle signals of input and output shafts.

Means for Solving the Problem

In the present invention, in particular, there is provided an electric control unit including; a basic assist current calculation section configured to calculate a basic assist current which is a command current to the electric motor, and which is based on a steering torque by a driver, a direction correspondence judgment section configured to judge whether or not a rotation direction of the input shaft and a rotation direction of the output shaft correspond with each other, an advancing phase judgment section configured to judge which of a phase of the first rotation angle signal and a phase of the second rotation angle signal is advanced, a normal/reverse judgment input judgment section configured to judge that a torsion of the torsion bar is generated by a normal input from the input shaft when the direction correspondence judgment section judges the direction correspondence, and when the advancing phase judgment section judges that the phase of the first rotation angle signal is advanced, and to judge that the torsion of the torsion bar is generated by a reverse input from the output shaft when the direction correspondence judgment section judges the direction correspondence, and when the advancing phase judgment section judges that the phase of the second rotation angle signal is advanced, a phase variation judgment section configured to judge whether or not an inversion of a torsion direction of the torsion bar is generated based on the phase of the first rotation angle signal and the phase of the second rotation angle signal, and a disturbance counter current calculation section configured to calculate a disturbance counter current which is greater than the basic assist current when the phase variation judgment section judges that a state where the inversion of the torsion direction of the torsion bar is not generated continues after the normal/reverse input judgment section judges the reverse input.

Benefit of The Invention

According to the present invention, it is possible to judge the oblique motion based on the disturbance with the high accuracy only by the steering angle signal, to assist, and to appropriately decrease the steering load of the driver.

DESCRIPTION OF EMBODIMENTS

Hereinafter, power steering devices according to embodiments of the present invention are explained with reference to drawings. Besides, in the below-described embodiments, the electric power steering devices and so on are applied to an electric power steering device for a vehicle, like the conventional device. It is explained, as an example, that a disturbance is caused by the travel on a transverse gradient road.

Figure 1:
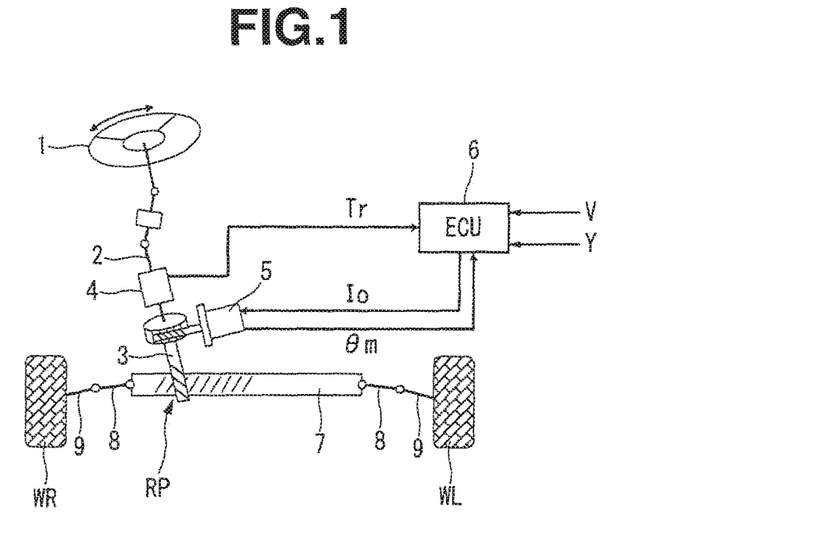
FIG. 1 is a system configuration view showing an electric power steering device according to the present invention.

FIG. 1 is a schematic view showing an electric power steering device according to the present invention, for explaining an outline of a system configuration of the power steering device.

The electric power steering device shown in the drawings includes an input shaft 2 including one end side connected to a steering wheel 11 to rotate as a unit with the steering wheel 1; an output shaft 3 including one end side connected through a torsion bar 4 (cf. FIG. 2) to the other end side of the input shaft 2 so as to be rotated relative to the input shaft 2, and the other end side connected through a rack and pinion mechanism RP which is a conversion mechanism, to steered wheels WL and WR; a torque sensor TS disposed on an outer circumference side of the input shaft 2, and arranged to sense a steering input torque based on a relative rotation displacement amount of the input shaft 2 and the output shaft 3; an electric motor 5 arranged to provide, to the output shaft 3, a steering assist torque according to a steering torque of a driver based on sensing results of the torque sensor TS, a steering sensor (not shown), a vehicle speed sensor (not shown) and so on; and an electric control unit 6 arranged to drivenly control the electric motor 5. In this case, a steering mechanism according to the present invention is constituted by the input shaft 2, the output shaft 3, and the rack and pinion mechanism RP.

The rack and pinon mechanism RP includes pinion teeth (not shown) formed on an outer circumference of the other end portion of the output shaft 3; and rack teeth (not shown) formed in a predetermined axial region of a rack shaft 7 disposed to be substantially perpendicular to the other end portion of the output shaft 3. The pinion teeth and the rack teeth are engaged with each other. The rack shaft 7 is arranged to be moved in the axial direction in accordance with a rotation direction of the output shaft 3. End portions of the rack shaft 7 are connected through tie rods 8 and 8 and knuckle arms 9 and 9 to the steered wheels WR and WL. The rack shaft 7 is moved in the axial direction, so that the knuckle arms 9 and 9 are pulled through the tie rods 8 and 8. With this, directions of the steered wheels WR and WL are varied.

Figure 2:
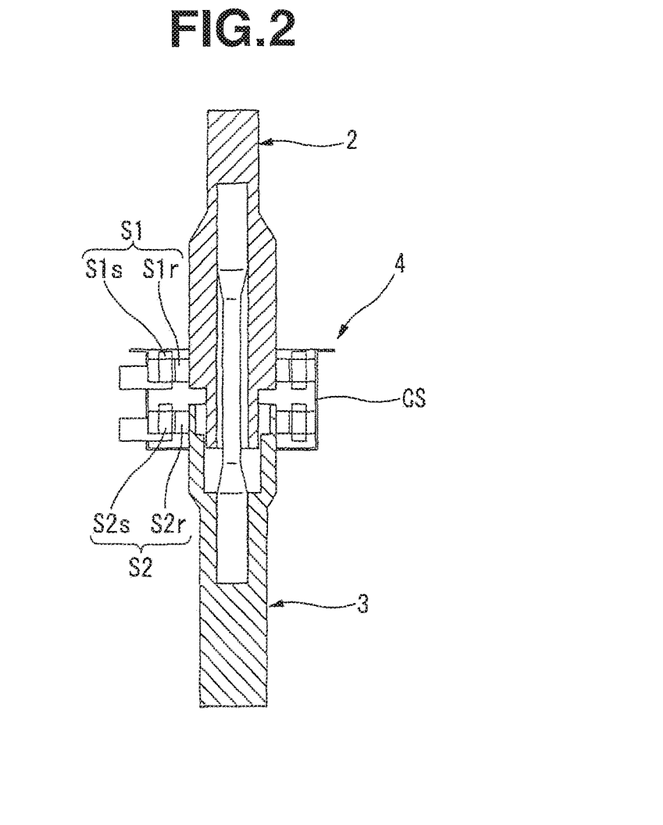
FIG. 2 is an enlarged longitudinal sectional view showing a portion near a connection portion between an input shaft and an output shaft which are shown in FIG. 1.

FIG. 2 is a longitudinal sectional view showing the torque sensor TS, and a portion near a connection portion between the input shaft 2 and the output shaft 3.

The torque sensor TS includes a casing CS surrounding an overlapped portion of the input shaft 2 and the output shaft 3; a first rotation angle sensor S1 disposed between the casing CS and the input shaft 2, and arranged to sense a rotation displacement of the input shaft 2; and a second rotation angle sensor S2 disposed between the casing CS and the output shaft 3, and arranged to sense a rotation displacement of the output shaft 3. The first and second rotation angle sensors S1 and S2 sense a relative rotation displacement amount between the input shaft 2 and the output shaft 3 based on a torsion variation of the torsion bar 4. With this, the torque sensor TS senses a steering torque inputted by a steering operation of the driver.

The first and second rotation angle sensors S1 and S2 are constituted, respectively, by known variable reluctance (VR) type resolvers. That is, the first rotation angle sensor S1 includes a first rotor S1r which has a circular shape, and which is mounted on an outer circumference surface of the input shaft 2 to rotate as a unit with the input shaft 2; and a first stator S1s which is fixed on the casing CS, and which is disposed to be overlapped with the outer circumference side of the first rotor S1r through a predetermined gap in the radial direction. Similarly, the second rotation angle sensor S2 includes a second rotor S2r which is mounted on an outer circumference surface of the output shaft 3 to rotate as a unit with the output shaft 3; and a second stator S2s which is fixed on the casing CS, and which is disposed to be overlapped with the outer circumference side of the second rotor S2r through a predetermined gap in the radial direction.

Figure 3:
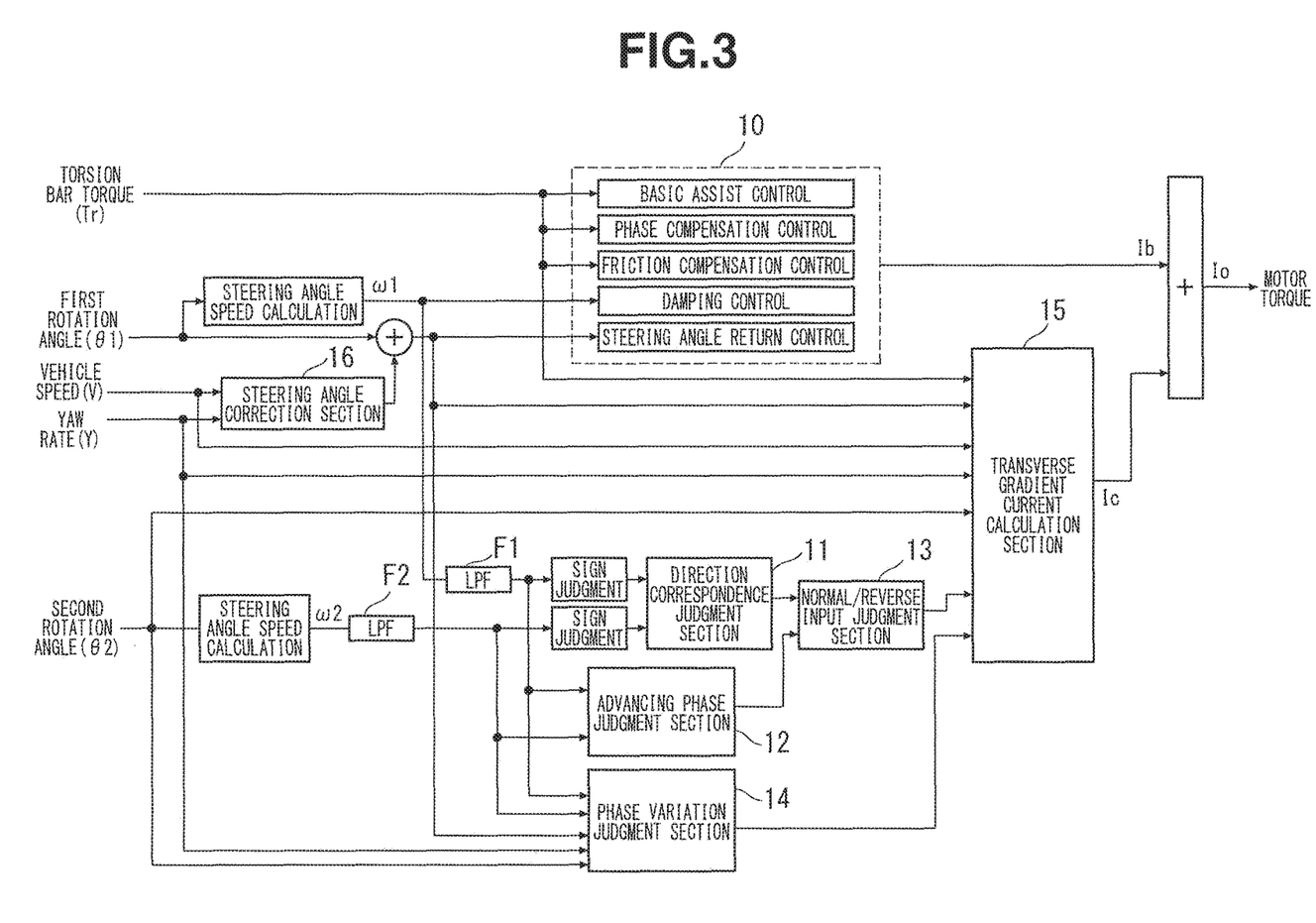
FIG. 3 is a control block diagram showing a control unit shown in FIG. 1.

FIG. 3 is a control block diagram showing a calculation circuit configuration within the electric control unit 6.

The electric control unit 6 includes a basic assist current calculation section 10 configured to calculate a basic assist current Ib which is a normal steering torque; a direction correspondence judgment section 11 configured to judge whether or not the rotation direction of the input shaft 2 and the rotation direction of the output shaft 3 correspond with (is aligned with) each other; an advancing phase judging section 12 configured to judge which a phase of one of first and second rotation angle signals θ1 and θ2 (described later) is advanced (proceeded); a normal/reverse input judgment section 13 configured to judge a normal input (positive input) or a reverse input (negative input) (described later) based on judgment results of the direction correspondence judgment section 11 and the advancing phase judgment section 12; a phase variation judgment section 14 configured to judge whether or not a torsion direction of the torsion bar 4 is inverted; and a transverse gradient current calculation section 15 which is a disturbance counter (opposing) current calculation section configured to calculate a transverse gradient current Ic which is a disturbance counter current that is greater than the basic assist current Ib when it is judged that the vehicle travels on the transverse gradient road from the judgment results of the normal/reverse input judgment section 13 and the phase variation judgment section 14.

Besides, a symbol 16 in FIG. 3 is a steering angle correction section configured to correct an offset amount of the first rotation angle sensor S1 from a neutral position, to zero, based on the vehicle speed signal V by a vehicle speed sensor (not shown) and a yaw rate signal Y by the yaw rate sensor (not shown). This steering angle correction section 16 is configured to consider that the vehicle travels on the transverse gradient road in a straight manner when the vehicle speed signal V is equal to or greater than a threshold value Vx as described below even when the first rotation angle sensor S1 senses a first rotation angle θ1, and correct the previously sensed first rotation angle θ1 to zero.

The basic assist current calculation section 10 is configured to calculate the basic assist Ib which is a command current to the electric motor 5, and which is a base of the steering assist torque, based on a vehicle driving state, that is, the output signal Tr of the torque sensor TS, the first rotation angle signal θ1 which is the output signal of the first rotation angle sensor S1, and which is received through a first rotation angle signal receiving section (not shown), the second rotation angle signal θ2 which is the output signal of the second rotation angle sensor S2, and which is received through a second rotation angle sensor S2, the output signal of the vehicle speed sensor, and so on.

The direction correspondence judgment section 11 is configured to judge whether or not the rotation direction of the input shaft 2 and the rotation direction of the output shaft 3 correspond with each other based on a first rotation angle speed signal ω1 which is obtained by differentiating the first rotation angle signal θ1 by the time, and a second rotation angle speed signal ω2 which is obtained by differentiating the second rotation angle signal θ2.

The advancing phase judgment section 12 is configured to judges which the phases of the first and second rotation angle signals θ1 and θ2 is advanced based on the variation amounts of the first and second rotation angle signals θ1 and θ2. In particular, the advancing phase judgment section 12 is configured to presume the phases of the first and second rotation angle signals θ1 and θ2 based on the variation amounts of the first and second rotation angle signals θ1 and θ2, and to compare these phases. With this, the advancing phase judgment section 12 is configured to perform the phase advance judgment of the first and second rotation angle signals θ1 and θ2.

The normal/reverse input judgment section 13 is configured to judges whether the torsion of the torsion bar 4 is generated due to an intended input from the input shaft 2's side, that is, the normal input (hereinafter, referred to simply as "the normal input"), or due to an unintended input from the output shaft 3's side, that is, the reverse input (hereinafter, referred to simply as "the reverse input").

Besides, symbols F1 and F2 in FIG. 3 are known low pass filters. The normal/reverse input judgment section 13 configured to judge whether the torsion of the torsion bar 4 is generated due to the normal input, or due to the reverse input, based on the rotation angle signals θ1 and θ2 which pass through the low pass filters.

The phase variation judgment section 14 is configured to judge whether or not the phase advance of the second rotation angle signal θ2 continues, that is, whether or not the torsion direction of the torsion bar 4 is inverted, by the above-described phase advance judgment based on the first rotation angle variation amount Δθ1 obtained from the first rotation angle signal θ1, and the second rotation angle variation amount Δθ2 obtained from the second rotation angle θ2.

The transverse gradient current calculation section 15 is configured to calculate the transverse gradient current Ic which is greater than the basic assist current Ib based on maps shown in FIG. 4 to FIG. 6 (described later) when the normal/reverse input judgement section 13 judges the reverse input, and when the phase variation judgment section 14 judges that a state where the inversion of the torsion direction of the torsion bar 4 is not generated continues. In particular, the transverse gradient current calculation section 15 calculates the transverse gradient current Ic by multiplying the basic assist Ib by a gain G obtained based on maps shown in FIG. 4 to FIG. 6 (described later). Besides, this transverse gradient current Ic is set to a value by which the torsion direction of the torsion bar 4 is not inverted.

Figure 4:
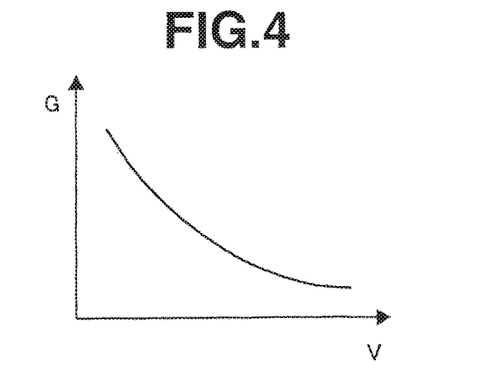
FIG. 4 is a map which is for a calculation of a current in a transverse gradient current calculation section shown in FIG. 3, and which shows a relationship between a vehicle speed V and a gain G.

FIG. 4 is a map which is for the current calculation in the transverse gradient current calculation section 15, and which represents a relationship between the vehicle speed V and the gain G.

As shown in the drawing, in the electric power steering device, the gain G is set to a smaller value as the vehicle signal V is higher. With this, the transverse gradient current Ic is calculated to be smaller as the vehicle speed shown by the vehicle signal V is higher. Accordingly, it is possible to perform the assist control according to the vehicle speed by the above-described setting since the steering load is decreased as the vehicle speed is higher.

Figure 5:
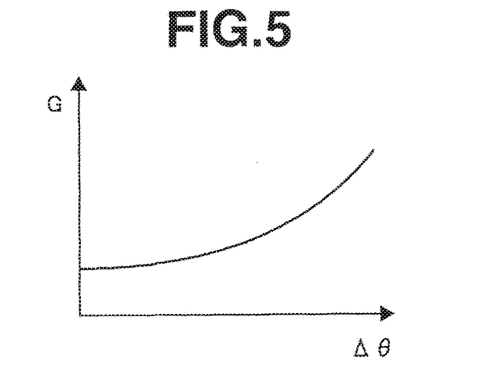
FIG. 5 is a map which is for the calculation of the current in the transverse gradient current calculation section shown in FIG. 3, and which shows a relationship between a relative angle difference $\Delta\theta$ between first and second rotation angle signals $\theta 1$ and $\theta 2$, and the gain G.

FIG. 5 is a map which is for the current calculation in the transverse gradient current calculation section 15, and which represents a relationship between the relative angle difference Δθ between the first and second rotation angle signals θ1 and θ2, and the gain G.

As shown in the drawing, in the electric power steering device, the gain G is set to a greater value as the relative angle difference Δθ (|θ2−θ1|) between the first and second rotation angle signals θ1 and θ2 is higher. With this, the transverse gradient current Ic is calculated to be greater as the relative angle difference Δθ is higher. That is, the torsion bar 4 is twisted as the relative angle difference Δθ is greater, so that the steering load becomes large. Accordingly, it is possible to perform the assist control according to the steering load by the above-described setting.

Figure 6:
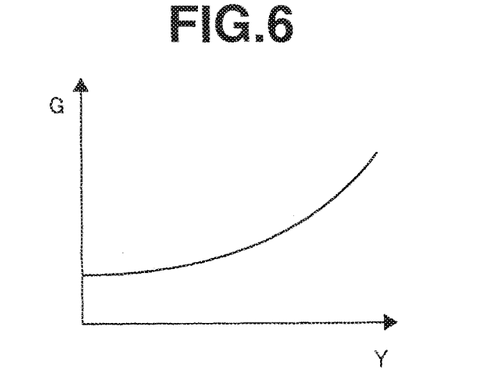
FIG. 6 is a map which is for the calculation of the current in the transverse gradient current calculation section shown in FIG. 3, and which shows a relationship between a yaw rate Y and the gain G.

FIG. 6 is a map which is for the current calculation in the transverse gradient current calculation section 15, and which represents a relationship between the yaw rate Y and the gain G.

As shown in the drawing, in the electric power steering device, the gain G is set to a greater value as the yaw rate Y is higher. With this the transverse gradient current Ic is calculated to be grater as a yaw rate moment of the vehicle which is shown by the yaw rate moment Y is greater. With this, it is possible to decrease the steering load of the driver due to the increase of the yaw moment such as the influence of side wind (cross wind, lateral wind).

Figure 7:
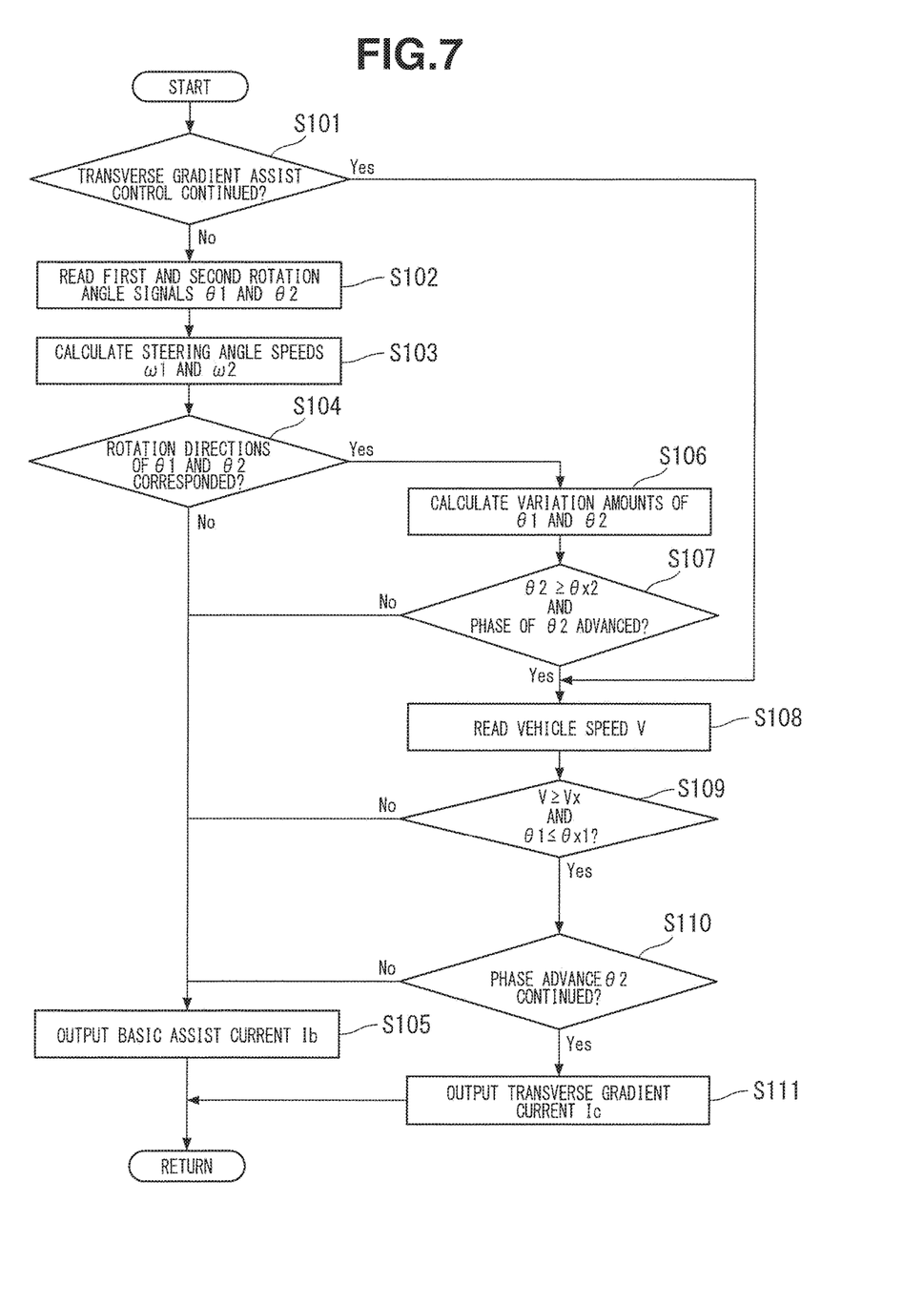
FIG. 7 is a flowchart showing control contents of a transverse gradient assist control according to the first embodiment of the present invention.

FIG. 7 is a flowchart showing the control contents of the transverse gradient assist control according to the first embodiment of the present invention.

That is, first, it is judged whether or not the transverse gradient assist control continues (step S101). When it is judged that this control continues, the process proceeds to step S108 (described later). On the other hand, when it is judged that the transverse gradient assist control does not continues at step S101, the first and second rotation angle signals θ1 and θ2 are read (step S102). The first and second rotation angle speed signals ω1 and ω2 are calculated based on the first and second rotation angle signals θ1 and θ2 (step S103). Then, the direction correspondence judgment section 11 judges whether or not the rotation directions of the first rotation angle signal θ1 and the second rotation angle signal θ2 correspond with each other based on the first and second rotation angle speed signals ω1 and ω2 (step S104).

When it is judged that the rotation directions of the first and second rotation angle signals θ1 and θ2 do not correspond with each other at step S104, the basic assist calculation section 10 calculates the basic assist current Ib. This basic assist current Ib is outputted, as the current command value Io, to the motor driving section. This program is finished (step S105). On the other hand, when it is judged that the rotation directions of the first and second rotation angle signals θ1 and θ2 correspond with each other, the advancing phase judgment section 12 calculates the variation amounts of the first and second rotation angle signals θ1 and θ2 (step S106). Then, it is judged whether or not the second rotation angle signal θ2 is equal to or greater than a threshold value θx2, and whether or not the phase of the second rotation angle signal θ2 is advanced, based on the variation amounts of the first and second rotation angle signals θ1 and θ2 (step S107).

When it is judged that the answer is No at step S107, the normal assist control based on the basic assist current Ib is performed (step S105). On the other hand, when it is judged that the answer is Yes at step S107 (the second rotation angle signal θ2 is equal to or greater than θx2, and the phase of the second rotation angle signal θ2 is advanced), the normal/reverse input judgment section 13 judges the reverse input. The vehicle speed signal V is read (step S108). Then, it is judged whether or not the vehicle speed signal V is equal to or greater than a threshold value Vx, and whether or not the first rotation angle signal θ1 is equal to or smaller than a threshold value θ1 (step S109) based on the vehicle speed signal V.

When it is judged that the answer is No at step S109, the normal assist control based on the basic assist current Ib is performed (step S105). On the other hand, it is judged that the answer is Yes (the vehicle speed signal V is equal to or greater than the threshold value Vx, and the first rotation angle signal θ1 is equal to or smaller than the threshold value θ1), the phase variation judgment section 14 judges whether or not the phase advance of the second rotation angle signal θ2 continues (step S110). In this case, when it is judged that the answer is No, the normal assist control based on the basic assist current Ib is performed (step S105). When the answer is Yes (the phase advance of the second rotation angle signal θ2 continues), the transverse gradient current calculation section 15 calculates the transverse gradient current Ic which is greater than the basic assist current Ib, and outputs the transverse gradient current Ic as the current command value Io, to the motor driving section (step S111). This program is finished.

Figure 8:
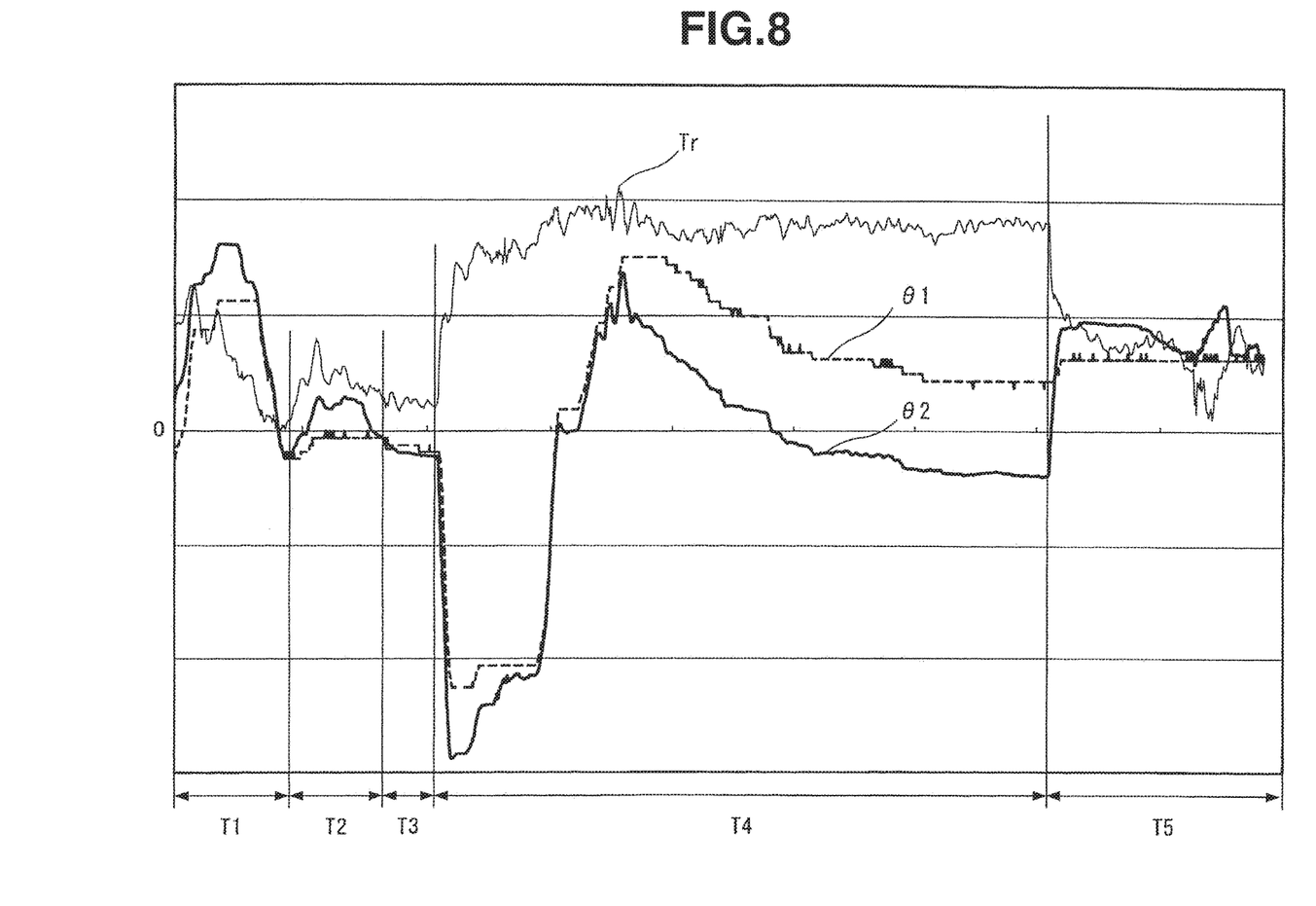
FIG. 8 is a time chart of a torque sensor output signal, and first and second rotation angle signals.

FIG. 8 is a time chart of the output signal Tr of the torque sensor TS, and the first and second rotation angle signals θ1 and θ2. Besides, in the drawing, a positive (upper half side) region is a leftward steering, and a negative (lower half side) region is a rightward steering. A thin solid line represents the output signal Tr of the torque sensor TS. A bold solid line represents the first rotation angle signal θ1. A bold solid line represents the second rotation angle signal θ2.

First, in a region T1, the first rotation angle signal θ1 is varied in the leftward direction in accordance with the variation of the second rotation angle signal θ2 in the leftward direction. That is, the leftward turning by the reverse input is generated. However, it is returned to the substantially neutral state by adding the rightward steering force which counters (opposes) this reverse input. This is a case where the temporal reverse input from the road surface side such as the step (uneven portion) is generated. In this state, the rotation directions of the first and second rotation angel signals θ1 and θ2 correspond with each other. Moreover, the phase of the second rotation angle signal θ2 is advanced. However, the phase advance state of the second rotation angle signal θ2 does not continue. Accordingly, the normal assist control is performed.

Next, in a region T2, the reverse input by which the second rotation angle signal θ2 is advanced and varied in the leftward direction is generated. However, the first rotation angle signal θ1 does not follow the reverse input. The rotation directions of the rotation angel signals θ1 and θ2 do not correspond with each other. Accordingly, the normal assist control continues. In a region T3, the second rotation angle signal θ2 is advanced and varied in the rightward direction. The first rotation angle signal θ1 is varied in the rightward directions to follow the second rotation angle signal θ2. Accordingly, the rotation directions of the first and second rotation angle signals θ1 and θ2 correspond with each other. However, the second rotation angle signal θ2 is smaller than the threshold value θ2. Consequently, the normal control further continues.

On the other hand, in a region T4, the first rotation angle signal θ1 is largely varied in the rightward direction in accordance with the large variation of the second rotation angle signal θ2 in the rightward direction. That is, the rightward turning based on the reverse input is performed. Then, the leftward steering state is maintained by adding the leftward steering force which counters this reverse input turning. Since the traveling on the transverse gradient road which is inclined on the right side (the shoulder side) is started, the steering state in the counter-steering direction (the leftward direction) is maintained so as to cancel the unintended turning based on the transverse gradient while the vehicle runs on the transverse gradient road. In this state, the rotation directions of the first and second rotation angle signals θ1 and θ2 correspond with each other. The second rotation angle signal θ2 is greater than the threshold value θ2. The phase of the second rotation angle signal θ2 is advanced. The vehicle speed signal V is equal to or greater than the threshold value Vx (not shown). The first rotation angle signal θ1 is equal to or smaller than the threshold value θ1. Accordingly, the transverse gradient assist control is performed.

Then, in a region T5, the second rotation angle signal θ2 is varied in the leftward direction based on the first rotation angle signal θ1. That is, the leftward direction turning based on the normal input is generated. The phases of first and second rotation angle signals θ1 and θ2 are inversed. That is, the phase of the first rotation angle signal θ1 is advanced. The steered wheels follows the leftward steering which counters the transverse gradient since the transverse gradient is finished. In this state, the phase advance of the second rotation angle signal θ2 does not continue. Accordingly, the transverse gradient assist control is finished. The process proceeds to the normal assist control.

As described above, in the electric power steering device, transverse gradient current Ic which is greater than the basic assist current Ib is outputted, as the current command value Io, to the motor driving section, when the direction correspondence judgment section 11 judges that the rotation directions of the first and second rotation angle signals θ1 and θ2 correspond with each other, when the advancing phase judgment section 12 judges that the phase of the second rotation angle θ2 is advanced, and when the phase variation judgment section judges that the phase advance state of the second rotation angle signal θ2 is continued. Accordingly, it is possible to judge the oblique motion (travel) state based on the transverse gradient road travel at the high accuracy only by the first and second rotation angle signals θ1 and θ2 at the high accuracy, to assist, and to appropriately decrease the steering load of the driver.

Besides, in this case, the transverse gradient current Ic is set to a value by which the torsion direction of the torsion bar 4 is not inverted. With this, the above-described transverse gradient assist control is not canceled. It is possible to perform the appropriate assist control (at the appropriate degree) with respect to the driver.

When it is judged whether or not the transverse gradient assist control is performed, the transverse assist control is performed only when the vehicle speed signal is equal to or greater than the threshold value Vx, in addition to the above-described conditions. Accordingly, there is no possibility of the excessive assist in the state where the vehicle speed is low, and where the influence due to the transverse gradient is small. It is possible to attain the preferable steering assist control.

Moreover, the normal/reverse input judgment section 13 is configured to judge whether the torsion of the torsion bar 4 is generated due to the normal input, or due to the reverse input, based on the first and second rotation angle signals θ1 and θ2 passing through the low pass filters F1 and F2. Accordingly, it is possible to suppress the erroneous determination in the normal/reverse input judgment section 13, and to perform the assist control with the high stability, in particular, at the travel on the rough road at which the large noise is generated in the rotation angle signals θ1 and θ2.

Furthermore, the steering angle correction section 16 judges that the vehicle travels straight on the transverse gradient road when the vehicle speed (vehicle speed signal V) is equal to or greater than the threshold value Vx even when the first rotation angle sensor S1 senses the first rotation angle θ1. With this, the first rotation angle θ1 which is previously sensed is corrected to zero. Then, the transverse gradient assist control is performed. Accordingly, it is possible to improve the accuracy of the first rotation angle signal θ1, and to suppress the erroneous determination of the transverse gradient assist control.

Figure 9:
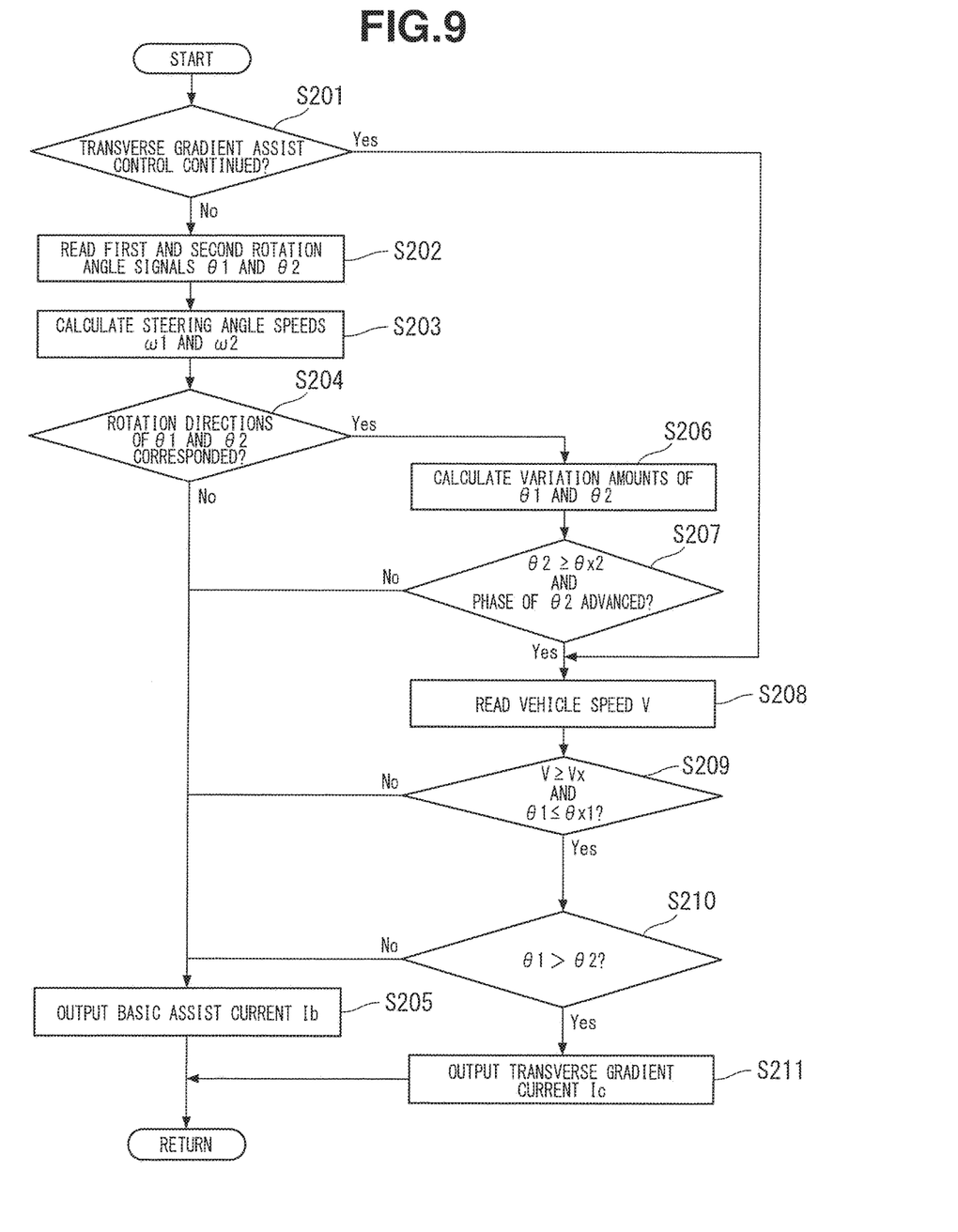
FIG. 9 is a flowchart showing control contents of a transverse gradient assist control according to a second embodiment of the present invention.

FIG. 9 is a flowchart showing control contents of a transverse gradient assist control according to a second embodiment of the present invention. The continuation judgment method of the transverse gradient assist control of the transverse gradient assist control flow is varied from that of the first embodiment.

That is, in the transverse gradient assist control flow, step S201 to S209 performs the same operation as those of step S101 to S109. When the first rotation angle signal θ1 is greater than the second rotation angle θ2 at step S210, it is judged that the vehicle travels on the transverse gradient road in the straight manner, or that the vehicle travels on a road on which an outer side of a turning radius is lower than an inner side of the turning radius. The transverse gradient assist control is performed (step S211).

Accordingly, in this embodiment, it is also possible to perform the appropriate steering assist in accordance with the conditions of the traveling road, and to attain the same effects as the first embodiment.

Figure 10:
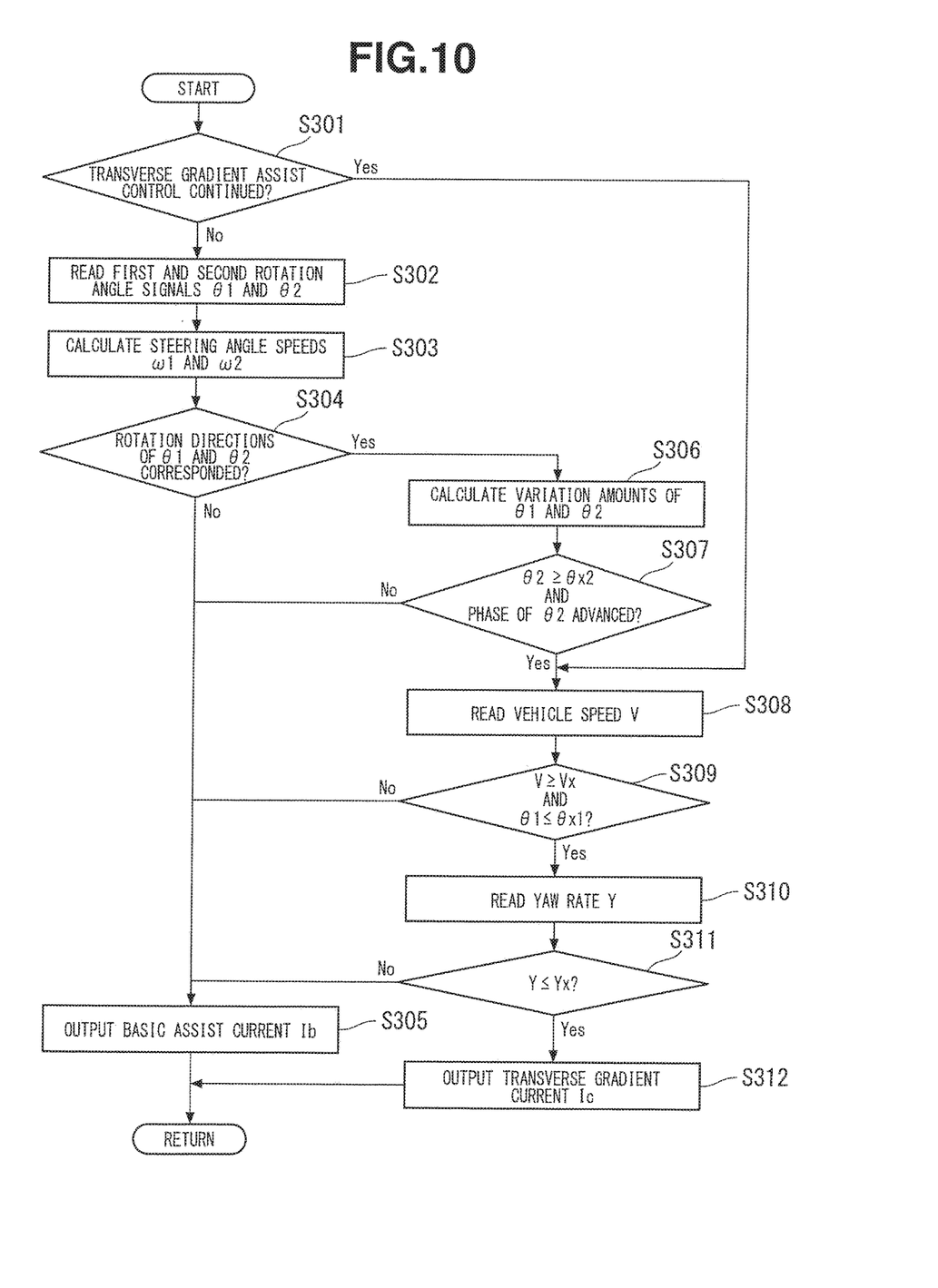
FIG. 10 is a flowchart showing control contents of a transverse gradient assist control according to a third embodiment of the present invention.

FIG. 10 is a flowchart showing control contents of a transverse gradient assist control according to a third embodiment of the present invention. The continuation judgment method of the transverse gradient assist control of the transverse gradient control flow is varied from that of the first embodiment.

That is, in the transverse gradient assist control flow, at steps S301 to S309, the same operations as those at step S101 to S109 in the first embodiment are performed. Then, the phase variation judgment section 14 reads yaw rate signal Y (step S310). Subsequently, it is judged whether or not the yaw rate signal Y is equal to or smaller than a threshold value Yx (step S311). In this case, when the answer is No, it is judged that the vehicle travels on a road on which an outer side of a turning radius is lower than an inner side of the turning radius. The normal assist control is performed (step S305). On the other hand, when the answer is Yes, it is judged that the vehicle travels straight on the transverse gradient road. The transverse gradient assist control is performed (step S312).

Accordingly, in this embodiment, it is possible to judge the two traveling states by the yaw rate signal Y (the yaw moment generated in the vehicle), and to perform the appropriate steering assist. Consequently, it is possible to attain the same effects as the first embodiment.

The present invention is not limited to the configurations of the embodiments. It is optional to freely vary in accordance with specifications and so on of the electric power steering device to which the present invention is applied as long as they are not deviated from the gist of the present invention.

In particular, in the embodiments, the oblique motion (travel) on the transverse gradient road is exemplified as one example of the cause of the oblique motion due to the disturbance. The transverse gradient assist control is applicable to, for example, an oblique motion due to the continuous disturbance of the other road surfaces such as a cant road, and an oblique motion due to the side (lateral wind) which is a disturbance other than the road surface.

Moreover, in the embodiments, the transverse gradient current Ic is calculated by multiplying the basic assist current Ib by the gain G. However, the calculation of the transverse gradient current Ic may be any various methods of the other methods such as adding the transverse gradient current Ic to the basic assist current Ib, or a method of switching an assist characteristics map without amendment.

Hereinafter, technical thoughts which is other than the claims, and which are grasped from the embodiments are explained.

(a) In the electric power steering device as described in claim 2, the disturbance counter current is calculated to a larger value as a yaw moment of the vehicle is larger.

By this configuration, it is possible to add the assist amount with respect to the yaw moment, and to decrease the steering load of the driver.

(b) In the electric power steering device as described in claim 1, the normal/reverse input judgment section is configured to judge whether the torsion of the torsion bar is generated due to the normal input or the reverse input based on the first rotation angle signal and the second rotation angle signal which pass through a low pass filter.

In this way, a high frequency component is removed. With this, it is possible to suppress the erroneous judgment, and to perform the assist control with the high stability.

(c) In the electric power steering device as described in claim 1, the phase variation judgment section is configured to judge that the vehicle travels straight on a transverse gradient road surface, or a road surface on which an outer side of a turning radius is lower than an inner side of the turning radius when the first rotation angel signal is greater than the second rotation angel signal; and the disturbance counter current calculation section configured to correct the disturbance counter current based a judgment result of the phase variation judgment section.

By this configuration, it is possible to perform the steering assist according to the conditions of the traveling road surface.

(d) In the electric power steering device as described in (c), the phase variation judgment section is configured to judge that vehicle travels on the transverse gradient road surface when a yaw moment of the vehicle is equal to or smaller than a predetermined value, and to judge that the vehicle travels on the road surface on which the outer side of the turning radius is lower than the inner side of the turning radius when the yaw moment is greater than the predetermined value.

By this configuration, it is possible to judge the two traveling states based on the yaw moment, and to perform the appropriate steering assist in accordance with the traveling state.

(e) In the electric power steering device as described in claim 1, the electric control unit includes a correction circuit configured to correct offset amounts of the first rotation angle sensor and the second rotation angle sensor from a neutral position.

By this configuration, it is possible to improve the accuracy of the first and second rotation angle sensors by the correction circuit section, and to suppress the erroneous judgment.

(f) In the electric power steering device as described in claim 1, the disturbance counter current is set to a value by which the torsion direction of the torsion bar is not inverted.

By this configuration, the disturbance counter assist control is not canceled. It is possible to perform the appropriate steering assist to the driver.

(g) In the electric power steering device as described in (f), the disturbance counter current is calculated to a smaller value as a vehicle speed is higher.

The steering load is decreased as the vehicle speed is higher. By this configuration, it is possible to perform the assist control in accordance with the vehicle speed.

(h) In the electric power steering device as described in (f), the disturbance counter current is calculated to a larger value as a difference between the first rotation angle signal and the second rotation angle signal is greater.

The torsion bar is further twisted as the relative angle difference is greater, so that the steering load becomes large. Accordingly, it is possible to perform the assist control in accordance with the steering load.

(i) In the electric power steering device as described in (f), the electric control unit is configured to output the disturbance counter current only when the vehicle speed is equal to or greater than a predetermined value.

By this configuration, it is possible to suppress the trouble in which the assist becomes excessive in a state where the influence by the transverse gradient is small when the vehicle speed is low.

(j) In the electric power steering device as described in (f), the disturbance counter current is calculated to a larger value as a yaw moment of the vehicle is larger.

By this configuration, it is possible to add the assist amount with respect to the yaw moment, and to decrease the steering load of the driver.

(k) In the electric power steering device as described in (6), the normal/reverse input judgment section is configured to judge whether the torsion of the torsion bar is generated due to the normal input, or due to the reverse input based on the first rotation angle signal and the second rotation angle signal which pass through a low pass filter.

In this way, the high frequency component is removed by the low pass filter. With this, it is possible to suppress the erroneous judgment at the travel on the rough road, and to perform the assist control with the high stability.

(l) In the electric power steering device as described in (f), the phase variation judgment section is configured to judge that the vehicle travels straight on a transverse gradient road surface, or on a road surface on which an outer side of a turning radius is lower than an inner side of the turning radius when the first rotation angel signal is greater than the second rotation angel signal; and the disturbance counter current calculation section configured to correct the disturbance counter current based a judgment result of the phase variation judgment section.

By this configuration, it is possible to perform the steering assist in accordance with the condition of the traveling road surface.

(m) In the electric power steering device as described in (l), the phase variation judgment section is configured to judge that vehicle travels on the transverse gradient road surface when a yaw moment of the vehicle is equal to or smaller than a predetermined value, and to judge that the vehicle travels on the road surface on which the outer side of the turning radius is lower than the inner side of the turning radius when the yaw moment is greater than the predetermined value.

By this configuration, it is possible to judge the two traveling state based on the yaw moment, and to perform the appropriate steering assist in accordance with the traveling state.

(n) In the electric power steering device as described in claim 6, the electric control unit includes a correction circuit section configured to correct offset amounts of the first rotation angle sensor and the second rotation angle sensor from a neutral position.

By this configuration, it is possible to improve the accuracy of the first and second rotation angle sensors by the correction circuit section, and to suppress the erroneous judgment.

EXPLANATION OF SYMBOLS

1 . . . steering wheel
2 . . . input shaft
3 . . . output shaft
5 . . . electric motor
6 . . . electric control unit
10 . . . basic assist current calculation section
11 . . . direction correspondence judgment section
12 . . . advancing phase judgment section
13 . . . normal/reverse input judgment section
14 . . . phase variation judgment section
15 . . . transverse gradient current calculation section (disturbance counter current calculation section)
RP . . . rack and pinion mechanism (conversion mechanism)
S1 . . . first rotation angle sensor
S2 . . . second rotation angle sensor
$\theta1$ . . . first rotation angle signal
$\theta2$ . . . second rotation angle signal
Ib . . . basic assist current
Ic . . . transverse gradient current (disturbance counter current)

The invention claimed is:

1. An electric power steering device comprising:
a steering mechanism including an input shaft arranged to be rotated in accordance with a steering operation of a steering wheel, an output shaft connected through a torsion bar to the input shaft, and a conversion mechanism configured to convert a rotation of the output shaft to a turning motion of a steering wheel;
a first rotation angle sensor provided to the input shaft, and configured to sense or presume a rotation angle of the input shaft, and to output the rotation angle of the input shaft as a first rotation angle signal;
a second rotation angle sensor provided to the output shaft, and configured to sense or presume a rotation angle of the output shaft, and to output the rotation angle of the output shaft as a second rotation angle signal;
an electric motor arranged to provide a steering assist force to the steering mechanism; and
an electric control unit configured to drivingly control the electric motor based on a driving state of a vehicle,
the electric control unit including;
a basic assist current calculation section configured to calculate a basic assist current which is a command current to the electric motor, and which is based on a steering torque by a driver,
a direction correspondence judgment section configured to judge whether or not a rotation direction of the input shaft and a rotation direction of the output shaft correspond with each other,
an advancing phase judgment section configured to judge which of a phase of the first rotation angle signal and a phase of the second rotation angle signal is advanced,
a normal/reverse judgment input judgment section configured to judge that a torsion of the torsion bar is generated by a normal input from the input shaft when the direction correspondence judgment section judges the direction correspondence, and when the advancing phase judgment section judges that the phase of the first rotation angle signal is advanced, and to judge that the torsion of the torsion bar is generated by a reverse input from the output shaft when the direction correspondence judgment section judges the direction correspondence, and when the advancing phase judgment section judges that the phase of the second rotation angle signal is advanced, a phase variation judgment section configured to judge whether or not an inversion of a torsion direction of the torsion bar is generated based on the phase of the first rotation angle signal and the phase of the second rotation angle signal, and a disturbance counter current calculation section configured to calculate a disturbance counter current which is greater than the basic assist current when the phase variation judgment section judges that a state where the inversion of the torsion direction of the torsion bar is not generated continues after the normal/reverse input judgment section judges the reverse input.

2. The power steering device as claimed in claim 1, wherein the disturbance counter current is set to a value by which the torsion direction of the torsion bar is not inverted.

3. The power steering device as claimed in claim 2, wherein the disturbance counter current is calculated to a smaller value as a vehicle speed is higher.

4. The power steering device as claimed in claim 2, wherein the disturbance counter current is calculated to a larger value as a difference between the first rotation angle signal and the second rotation angle signal is greater.

5. The power steering device as claimed in claim 2, wherein the electric control unit is configured to output the disturbance counter current only when the vehicle speed is equal to or greater than a predetermined value.

6. The power steering device as claimed in claim 2, wherein the disturbance counter current is calculated to a larger value as a yaw moment of the vehicle is larger.

7. The power steering device as claimed in claim 1, wherein the normal/reverse input judgment section is configured to judge whether the torsion of the torsion bar is generated due to the normal input, or due to the reverse input based on the first rotation angle signal and the second rotation angle signal which pass through a low pass filter.

8. The power steering device as claimed in claim 1, wherein the phase variation judgment section is configured to judge that the vehicle travels straight on a transverse gradient road surface, or on a road surface on which an outer side of a turning radius is lower than an inner side of the turning radius when the first rotation angel signal is greater than the second rotation angel signal; and the disturbance counter current calculation section configured to correct the disturbance counter current based a judgment result of the phase variation judgment section.

9. The power steering device as claimed in claim 8, wherein the phase variation judgment section is configured to judge that vehicle travels on the transverse gradient road surface when a yaw moment of the vehicle is equal to or smaller than a predetermined value, and to judge that the vehicle travels on the road surface on which the outer side of the turning radius is lower than the inner side of the turning radius when the yaw moment is greater than the predetermined value.

10. The power steering device as claimed in claim 1, wherein the electric control unit includes a correction circuit section configured to correct offset amounts of the first rotation angle sensor and the second rotation angle sensor from a neutral position.

11. A control device for an electric power steering device comprising:

a first rotation angle receiving section configured to receive a first rotation angle signal outputted from a first rotation angle sensor arranged to sense a rotation angle of an input shaft arranged to be rotated in accordance with a steering operation of a steering wheel;

a second rotation angle receiving section configured to receive a second rotation angle signal outputted from a second rotation angle sensor arranged to sense a rotation angle of an output shaft connected through a torsion bar to the input shaft;

a basic assist current calculation section configured to calculate a basic assist current which is a command current to the electric motor, and which is based on a steering torque by a driver;

a direction correspondence judgment section configured to judge whether or not a rotation direction of the input shaft and a rotation direction of the output shaft correspond with each other;

an advancing phase judgment section configured to judge which of a phase of the first rotation angle signal and a phase of the second rotation angle signal is advanced;

a normal/reverse judgment input judgment section configured to judge that a torsion of the torsion bar is generated by a normal input from the input shaft when the direction correspondence judgment section judges the direction correspondence, and when the advancing phase judgment section judges that the phase of the first rotation angle signal is advanced, and to judge that the torsion of the torsion bar is generated by a reverse input from the output shaft when the direction correspondence judgment section judges the direction correspondence, and when the advancing phase judgment section judges that the phase of the second rotation angle signal is advanced;

a phase variation judgment section configured to judge whether or not an inversion of a torsion direction of the torsion bar is generated based on the phase of the first rotation angle signal and the phase of the second rotation angle signal; and a disturbance counter current calculation section configured to calculate a disturbance counter current which is greater than the basic assist current when the phase variation judgment section judges that a state where the inversion of the torsion direction of the torsion bar is not generated continues after the normal/reverse input judgment section judges the reverse input.

12. The control device for the power steering device as claimed in claim 11, wherein the disturbance counter current is set to a value by which the torsion direction of the torsion bar is not inverted.

13. The control device for the power steering device as claimed in claim 12, wherein the disturbance counter current is calculated to a smaller value as a vehicle speed is higher.

14. The control device for the power steering device as claimed in claim 12, wherein the disturbance counter current is calculated to a larger value as a difference between the first rotation angle signal and the second rotation angle signal is greater.

15. The control device for the power steering device as claimed in claim 12, wherein the electric control unit is configured to output the disturbance counter current only when the vehicle speed is equal to or greater than a predetermined value.

16. The control device for the power steering device as claimed in claim 12, wherein the disturbance counter current is calculated to a larger value as a yaw moment of the vehicle is larger.

17. The control device for the power steering device as claimed in claim 11, wherein the normal/reverse input judgment section is configured to judge whether the torsion of the torsion bar is generated due to the normal input, or due to the reverse input based on the first rotation angle signal and the second rotation angle signal which pass through a low pass filter.

18. The control device for the power steering device as claimed in claim 11, wherein the phase variation judgment section is configured to judge that the vehicle travels straight on a transverse gradient road surface, or on a road surface on which an outer side of a turning radius is lower than an inner side of the turning radius when the first rotation angel signal is greater than the second rotation angel signal; and the disturbance counter current calculation section configured to correct the disturbance counter current based a judgment result of the phase variation judgment section.

19. The control device for the power steering device as claimed in claim 18, wherein the phase variation judgment section is configured to judge that vehicle travels on the transverse gradient road surface when a yaw moment of the vehicle is equal to or smaller than a predetermined value, and to judge that the vehicle travels on the road surface on which the outer side of the turning radius is lower than the inner side of the turning radius when the yaw moment is greater than the predetermined value.

20. The control device for the power steering device as claimed in claim 11, wherein the electric control unit includes a correction circuit configured to correct offset amounts of the first rotation angle sensor and the second rotation angle sensor from a neutral position.

\* \* \* \* \*